US009856570B2

United States Patent
Raman et al.

(10) Patent No.: US 9,856,570 B2
(45) Date of Patent: *Jan. 2, 2018

(54) SYSTEM AND METHOD FOR PARALLEL SOLUTION EXTRACTION OF ONE OR MORE METAL VALUES FROM METAL-BEARING MATERIALS

(71) Applicant: FREEPORT MINERALS CORPORATION, Phoenix, AZ (US)

(72) Inventors: Anand Raman, Phoenix, AZ (US); Jason M Morgan, Morenci, AZ (US); Barbara J Savage, Silver City, NM (US); David G Meadows, Phoenix, AZ (US); Wayne W Hazen, Lakewood, CO (US)

(73) Assignee: FREEPORT MINERALS CORPORATION, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,383

(22) Filed: Aug. 18, 2016

(65) Prior Publication Data

US 2016/0355937 A1 Dec. 8, 2016

Related U.S. Application Data

(60) Continuation of application No. 13/837,158, filed on Mar. 15, 2013, now Pat. No. 9,447,483, which is a
(Continued)

(51) Int. Cl.
*C22B 19/00* (2006.01)
*C22B 3/02* (2006.01)
(Continued)

(52) U.S. Cl.
CPC ............ *C25C 1/22* (2013.01); *B01D 11/0488* (2013.01); *C22B 3/0005* (2013.01); *C22B 3/02* (2013.01);
(Continued)

(58) Field of Classification Search
CPC .... Y02P 10/236; Y02P 10/212; C22B 3/0005; C22B 60/026; C22B 3/02; C25B 9/00; C25C 1/12
(Continued)

(56) References Cited

U.S. PATENT DOCUMENTS 1,614,669 A 1/1927 Greenawalt
1,798,255 A 3/1931 Greenawalt
(Continued)

FOREIGN PATENT DOCUMENTS

EP 1063307 12/2000
JP 2001239139 9/2001
(Continued)

OTHER PUBLICATIONS

International Search Report and Written Opinion issued from corresponding International Application No. PCT/US2012/069392, dated Mar. 14, 2013.
(Continued)

*Primary Examiner* — Zulmariam Mendez
(74) *Attorney, Agent, or Firm* — Snell & Wilmer L.L.P.

(57) ABSTRACT

The present disclosure relates to a process and system for recovery of one or more metal values using solution extraction techniques and to a system for metal value recovery. In an exemplary embodiment, the solution extraction system comprises a first solution extraction circuit and a second solution extraction circuit. A first metal-bearing solution is provided to the first and second circuit, and a second metal-bearing solution is provided to the first circuit. The first circuit produces a first rich electrolyte solution, which can be forwarded to primary metal value recovery, and a low-grade raffinate, which is forwarded to secondary metal value recovery. The second circuit produces a second rich electrolyte solution, which is also forwarded to primary
(Continued)

metal value recovery. The first and second solution extraction circuits have independent organic phases and each circuit can operate independently of the other circuit.

20 Claims, 3 Drawing Sheets

Related U.S. Application Data division of application No. 13/331,699, filed on Dec. 20, 2011, now Pat. No. 8,420,048.

(51) Int. Cl.
| | |
|---|---|
| C25C 1/22 | (2006.01) |
| C25C 1/08 | (2006.01) |
| C25C 7/00 | (2006.01) |
| C25C 1/00 | (2006.01) |
| C22B 3/26 | (2006.01) |
| B01D 11/04 | (2006.01) |
| C22B 3/44 | (2006.01) |
| C22B 3/00 | (2006.01) |
| C22B 34/34 | (2006.01) |
| C22B 59/00 | (2006.01) |
| C22B 60/02 | (2006.01) |
| C22B 61/00 | (2006.01) |

(52) U.S. Cl.
CPC ............... *C22B 3/44* (2013.01); *C22B 11/04* (2013.01); *C22B 19/00* (2013.01); *C22B 23/0407* (2013.01); *C22B 23/0453* (2013.01); *C22B 23/0461* (2013.01); *C22B 34/34* (2013.01); *C22B 59/00* (2013.01); *C22B 60/0221* (2013.01); *C22B 60/0252* (2013.01); *C22B 60/0278* (2013.01); *C22B 61/00* (2013.01); *C25C 1/00* (2013.01); *C25C 1/08* (2013.01); *C25C 7/00* (2013.01); *Y02P 10/234* (2015.11)

(58) Field of Classification Search
USPC .......................................................... 204/233
See application file for complete search history.

(56) References Cited

U.S. PATENT DOCUMENTS

| | | | |
|---|---|---|---|
| 1,808,547 A | 6/1931 | Greenawalt | |
| 1,841,437 A | 1/1932 | Greenawalt | |
| 3,524,723 A | 8/1970 | Millsap et al. | |
| 3,528,784 A | 9/1970 | Green | |
| 3,615,170 A | 10/1971 | Hazen et al. | |
| 4,013,754 A | 3/1977 | Stauter et al. | |
| 4,152,142 A | 5/1979 | Schlitt et al. | |
| 4,272,492 A | 6/1981 | Jensen | |
| 4,338,168 A | 7/1982 | Stanley et al. | |
| 4,526,215 A | 7/1985 | Harrison et al. | |
| 4,582,689 A | 4/1986 | Kordosky | |
| 4,666,512 A | 5/1987 | Hansen et al. | |
| 4,957,714 A | 9/1990 | Olafson et al. | |
| 5,356,457 A | 10/1994 | Pincheira Alvarez et al. | |
| 5,431,788 A | 7/1995 | Jones | |
| 5,470,552 A | 11/1995 | Kordosky et al. | |
| 5,632,963 A | 5/1997 | Schwab et al. | |
| 5,645,708 A | 7/1997 | Jones | |
| 5,650,057 A | 7/1997 | Jones | |
| 5,869,012 A | 2/1999 | Jones | |
| 5,879,556 A | 3/1999 | Hein | |
| 5,902,474 A | 5/1999 | Jones | |
| 5,908,605 A | 6/1999 | Virnig et al. | |
| 5,919,674 A | 7/1999 | Tunley | |
| 5,976,218 A | 11/1999 | Virnig et al. | |
| 6,107,523 A | 8/2000 | Virnig et al. | |
| 6,171,564 B1 | 1/2001 | Jones | |
| 6,177,055 B1 | 1/2001 | Virnig et al. | |
| 6,242,625 B1 | 6/2001 | Kordosky | |
| 6,245,125 B1 | 6/2001 | Dew et al. | |
| RE37,251 E | 7/2001 | Jones | |
| 6,350,354 B1 | 2/2002 | Neuman et al. | |
| 6,395,062 B2 | 5/2002 | Olafson et al. | |
| 6,432,167 B1 | 8/2002 | Virnig et al. | |
| 6,455,019 B2 | 9/2002 | Jones | |
| 6,582,494 B1 | 6/2003 | Dew et al. | |
| 6,596,053 B2 | 7/2003 | Virnig et al. | |
| 6,599,414 B1 | 7/2003 | Virnig et al. | |
| 6,702,872 B1 | 3/2004 | Virnig et al. | |
| 6,726,887 B1 | 4/2004 | Sugarman | |
| 6,733,688 B1 | 5/2004 | Sugarman et al. | |
| 7,166,144 B2 | 1/2007 | Hein et al. | |
| 7,169,371 B2 | 1/2007 | Jones | |
| 7,214,256 B2 | 5/2007 | Kordosky et al. | |
| 7,309,474 B2 | 12/2007 | Soderstrom | |
| 7,390,468 B2 | 6/2008 | Pekkala et al. | |
| 3,003,064 A1 | 8/2011 | Savage et al. | |
| 8,372,360 B2 | 2/2013 | Savage et al. | |
| 8,372,361 B2 | 2/2013 | Savage et al. | |
| 8,420,048 B1 | 4/2013 | Raman et al. | |
| 2004/0103756 A1 | 6/2004 | Kordosky et al. | |
| 2004/0141896 A1 | 7/2004 | Pekkala et al. | |
| 2004/0228783 A1 | 11/2004 | Harris et al. | |
| 2004/0261579 A1 | 12/2004 | Hein et al. | |
| 2005/0031512 A1 | 2/2005 | Kordosky et al. | |
| 2005/0066773 A1 | 3/2005 | Harlamovs et al. | |
| 2006/0088458 A1 | 4/2006 | Kordosky et al. | |
| 2006/0117908 A1 | 6/2006 | Virnig et al. | |
| 2009/0074639 A1* | 3/2009 | Savage ................ C22B 3/0005 423/8 |

FOREIGN PATENT DOCUMENTS

| | | |
|---|---|---|
| WO | WO0015857 | 3/2000 |
| WO | WO02092863 | 11/2002 |
| WO | WO2006041695 | 4/2006 |

OTHER PUBLICATIONS

International Search Report and Written Opinion issued from International Application No. PCT/US2012/065570, dated Mar. 14, 2013.
Written Opinion of the International Preliminary Examining Authority issued from corresponding International Application No. PCT/US2012/069392, dated Nov. 22, 2013.
Written Opinion of the International Preliminary Examining Authority issued from International Application No. PCT/US2012/065570, dated Nov. 22, 2013.
International Preliminary Report on Patentability issued from corresponding International Application No. PCT/US2012/069392, dated Apr. 7, 2014.
International Preliminary Report on Patentability issued from corresponding International Application No. PCT/US2012/065570, dated Apr. 7, 2014.
Non-Final Office Action from U.S. Appl. No. 13/829,328, dated May 6, 2014.
Final Office Action from U.S. Appl. No. 13/829,328, dated Oct. 20, 2014.
Non-Final Office Action from U.S. Appl. No. 13/837,158, dated Dec. 26, 2014.
Notice of Allowance from U.S. Appl. No. 13/829,328, dated Jan. 2, 2015.
Supplemental Notice of Allowance from U.S. Appl. No. 13/829,328 dated Apr. 7, 2015.
Non-Final Office Action from U.S. Appl. No. 13/837,158, dated Aug. 13, 2015.
Final Office Action from U.S. Appl. No. 13/837,158, dated Feb. 25, 2016.
Notice of Allowance from U.S. Appl. No. 13/837,158, dated May 18, 2016.

(56) References Cited

OTHER PUBLICATIONS

International Search Report and Written Opinion from corresponding International Application No. PCT/US2008/075037 dated Dec. 10, 2008.
International Preliminary Report on Patentability from corresponding International Application No. PCT/US2008/075037, dated Apr. 1, 2010.
Non-Final Office Action from U.S. Appl. No. 11/856,605, dated Aug. 12, 2010.
Non-Final Office Action from U.S. Appl. No. 11/856,605, dated Nov. 19, 2010.
Examination Report from corresponding Australian Patent Application No. 2008302558, dated Sep. 17, 2010.
Examination Report from corresponding European Patent Application No. 08 832 712.7, dated Aug. 20, 2010.
Examination Report from corresponding European Patent Application No. 08 832 712.7, dated Jul. 4, 2011.
Anderson et al.: "Selection and Sizing of Copper Solvent Extraction and Electrowinning Equipment and Circuits"; Mineral Processing, 2002.
Owusu, George; "Selective Extraction of Copper from Acidic Zinc Sulfate Leach Solution Using LIX 622"; Hydrometallugy, Jan. 1999, 51(1), pp. 1-8.
Kordosky, G.A.; "Copper Recovery Using Leach/Solvent Extraction/Electrowinning Technology: Forty Years of Innovation, 2.2 Million Tonnes of Copper Annually" The Journal of the South African Institute of Mining and Metallurgy, Nov./Dec. 2002, pp. 445-450.
Jergensen, Gerald V.; "Copper Leaching, Solvent Extraction, and Electrowinning Technology"; Society for Mining, Metallurgy, and Exploration, Inc.; 1999.
O'Brien, et al.; "Operational Changes at Phelps Dodge's Morenci Mine".
White, R. Hunter; "Morenci: Making the Most of a World Class Resource"; pp. 229-238.
"Escondida" Paper.
Notice of Allowance from U.S. Appl. No. 11/856,605, dated Apr. 19, 2011.
Restriction Requirement from U.S. Appl. No. 13/188,231, dated Nov. 21, 2011.
Non-Final Office Action from U.S. Appl. No. 13/188,231, dated Feb. 8, 2012.
Non-Final Office Action from U.S. Appl. No. 13/188,231, dated Jul. 25, 2012.
Examiner Interview from U.S. Appl. No. 13/188,231, dated Sep. 7, 2012.
Notice of Allowance from U.S. Appl. No. 13/188,231, dated Oct. 10, 2012.
Supplemental Notice of Allowance from U.S. Appl. No. 13/188,231, dated Nov. 15, 2012.
Non-Final Office Action from U.S. Appl. No. 13/302,369, dated Apr. 3, 2012.
Final Office Action from U.S. Appl. No. 13/302,369, dated Sep. 13, 2012.
Notice of Allowance from U.S. Appl. No. 13/302,369, dated Oct. 12, 2012.
Examination Report dated Nov. 15, 2011 in corresponding Chilean Patent Application No. 2712-2008 and machine translation of same in English.
Examination Report dated Oct. 12, 2011 in Canadian Patent Application No. 2,699,893.
Examination Report dated May 15, 2012 in Peruvian Patent Application No. 001618-2008.
Restriction Requirement from U.S. Appl. No. 13/331,699, dated May 10, 2012.
Non-Final Office Action from U.S. Appl. No. 13/331,699, dated Jul. 13, 2012.
Final Office Action from U.S. Appl. No. 13/331,699, dated Nov. 1, 2012.
Notice of Allowance from U.S. Appl. No. 13/331,699, dated Dec. 24, 2012.
U.S. Environmental Protection Agency; "Extraction and Beneficiation of Ores and Minerals"; Technical Resource Document, vol. 4 Copper, Aug. 1994, 363 pages.

* cited by examiner

SYSTEM AND METHOD FOR PARALLEL SOLUTION EXTRACTION OF ONE OR MORE METAL VALUES FROM METAL-BEARING MATERIALS

CROSS REFERENCE TO RELATED APPLICATIONS

This application is a continuation of and claims priority to U.S. patent application Ser. No. 13/837,158, entitled "SYSTEM AND METHOD FOR PARALLEL SOLUTION EXTRACTION OF ONE OR MORE METAL VALUES FROM METAL-BEARING MATERIALS," which was filed on Mar. 15, 2013. The '158 Application is a divisional application of and claims priority to U.S. patent application Ser. No. 13/331,699, entitled "SYSTEM AND METHOD FOR PARALLEL SOLUTION EXTRACTION OF ONE OR MORE METAL VALUES FROM METAL-BEARING MATERIALS," which was filed on Dec. 20, 2011, now U.S. Pat. No. 8,420,048 issued Apr. 16, 2013. The aforementioned applications are hereby incorporated by reference herein in their entirety.

FIELD OF INVENTION

The present invention relates generally to processes and systems for recovery of one or more metals from metal-bearing materials. More particularly, the invention relates to metal recovery systems which include solution extraction and to methods of using the systems.

BACKGROUND OF THE INVENTION

Hydrometallurgical treatment of metal-bearing materials, such as metal ores, metal-bearing concentrates, and other metal-bearing substances, has been well established for many years. Moreover, leaching of metal-bearing materials is a fundamental process utilized to extract metals from metal-bearing materials. In general, the first step in this process is contacting the metal-bearing material with an aqueous solution containing a leaching agent or agents which extract the metal or metals from the metal-bearing material into solution to yield an aqueous metal-bearing pregnant leach solution. For example, in copper leaching operations, especially operations involving copper recovery from copper-containing minerals such as chalcopyrite, chalcocite, covellite, malachite, pseudomalachite, azurite, chrysocolla, and cuprite, sulfuric acid in an aqueous solution is contacted with copper-bearing ore. During the leaching process, acid in the leach solution may be consumed and various soluble metal components are dissolved, thereby increasing the metal content of the aqueous solution.

The aqueous leach solution containing the leached metal can then be treated via a process referred to as solution extraction (also referred to as solvent or liquid-liquid extraction or liquid ion exchange) wherein the aqueous leach solution is contacted with an organic solution comprising a metal extraction reagent, for example, an aldoxime and/or ketoxime or a mixture thereof. The metal extraction reagent extracts the metal from the aqueous phase into the organic phase. Moreover, during the solution extraction process for copper and certain other metals, leaching agent may be regenerated in the aqueous phase. For example, in the case where sulfuric acid is the leaching agent, sulfuric acid is regenerated in the aqueous phase when copper is extracted into the organic phase by the extraction reagent.

In a typical agitation leaching process for copper, followed by solution extraction, the leach solution may be diluted to a lesser or greater extent with acidified water in conjunction with the solid-liquid separation process needed to provide a clarified leach liquor and solid discharge. The diluted clarified leach solution then typically undergoes solution extraction at a solution-extraction plant or facility, wherein a primary metal value, for example, copper, is removed from, and the sulfuric acid concentration is increased in, the aqueous phase. A portion of this copper-depleted, acid-containing aqueous phase, now called the raffinate, may be recycled back to the leaching process, recycled to the front of the solid-liquid separation process, and/or forwarded to secondary metal extraction processes, including but not limited to cobalt recovery. Alternatively, leach streams of different grades may be treated at separate plants or facilities and the respective raffinates and organic solutions may be cycled or recycled within such plants or facilities.

Using typical leaching and solution extraction processes, large concentrations of soluble metal and metal precipitate of a primary metal value can be lost in the metal-depleted, acid-containing raffinate. These losses lead to inefficiencies and low overall process yields. Furthermore, these high metal concentrations in the raffinate may make recovery of secondary metals relatively costly and possibly impractical.

Typically, a solution-extraction plant includes a single circuit to extract the metal values from the leach solution. Although this can work relatively well in some circumstances, recovery of a primary metal value from leach solutions using a single-circuit solution-extraction plant or facility can lead to significant down-time and decreased metal output of the primary metal value when the solution extraction circuit is inoperative due to, for example, necessary repairs or maintenance.

Accordingly, a process and system that use solution extraction to extract a primary metal value from a leach solution and decrease the concentration of the primary metal value, for example, copper, in the resultant raffinate solution, while simultaneously providing for increased loading of the primary metal value in the metal extraction reagent, are desirable. In addition, an improved process and system that reduce plant down-time are desired.

SUMMARY OF THE INVENTION

The present invention relates generally to a system and process for recovery of one or more metal values from metal-bearing materials. In various aspects of exemplary embodiments, recovery of metal values from a metal-bearing material is improved by providing a solution extraction system and process that include at least two metal-bearing solutions and at least two solution extraction circuits. As set forth in more detail below, various advantages of the system and method of the present invention include robust primary metal value recovery, improved secondary metal value recovery, and/or improved solution extraction facility utilization.

In accordance with various embodiments, a system for solution extraction of one or more metal values comprises a first metal-bearing solution, a second metal-bearing solution, a first solution extraction circuit, and a second solution extraction circuit. In accordance with various aspects of these embodiments, the first solution extraction circuit is coupled to the first metal-bearing solution and the second metal-bearing solution and comprises at least two extractors and at least one stripping unit. In accordance with further aspects, the second solution extraction circuit is coupled to the first metal-bearing solution and comprises at least one extractor and at least one stripping unit. In accordance with additional aspects, the first solution extraction circuit includes four extractors and two stripping units, and the second solution extraction circuit includes two extractors and one stripping unit.

In accordance with additional exemplary embodiments, a solution extraction process comprises providing a first metal-bearing solution to a first solution extraction circuit and a second solution extraction circuit, and providing a second metal-bearing solution to the first solution extraction circuit. In accordance with various aspects of these exemplary embodiments, the first solution extraction circuit produces a first rich electrolyte solution and a low-grade raffinate, and the second solution extraction circuit produces a second rich electrolyte solution. In accordance with additional aspects, the first solution extraction circuit produces a first high-grade raffinate and the second solution extraction circuit produces a second high-grade raffinate. In accordance with yet further aspects, the first metal-bearing solution is provided to a first extractor of the first circuit and a first extractor of the second circuit. And, in accordance with yet further aspects, the second metal-bearing solution is provided to a third extractor of the first circuit.

In accordance with yet further aspects of the embodiments, a metal recovery process comprises preparing a metal-bearing material, performing a reactive process on the metal-bearing material, subjecting the metal-bearing material to a conditioning step, subjecting the metal-bearing material to a solution extraction step using the solution extraction system and process described herein, and subjecting the resultant rich electrolyte solutions and low-grade raffinate to metal value recovery.

BRIEF DESCRIPTION OF THE DRAWINGS

The subject matter of the present disclosure is particularly pointed out and distinctly claimed in the concluding portion of the specification. A more complete understanding of the present invention, however, may best be obtained by referring to the detailed description when considered in connection with the drawing figures, wherein like numerals denote like elements and wherein:

DETAILED DESCRIPTION OF EXEMPLARY EMBODIMENTS

The detailed description of exemplary embodiments of the invention herein sets forth various exemplary embodiments. While these exemplary embodiments are described in sufficient detail to enable those skilled in the art to practice the invention, it should be understood that other embodiments may be realized and that logical and mechanical changes may be made without departing from the spirit and scope of the present invention. Rather, the following disclosure is intended to teach both the implementation of the exemplary embodiments and any equivalent embodiments. Additionally, all included figures are non-limiting illustrations of the exemplary embodiments and modes, which similarly avail themselves of any equivalent embodiments.

As set forth in more detail below, various embodiments of the present invention provide significant advancements over prior art processes, particularly with regard to metal recovery and process efficiency. Moreover, existing copper recovery processes that utilize a reactive process for metal recovery that also involves solution extraction and electrowinning processes may, in many instances, be easily retrofitted to exploit the many commercial benefits the present invention provides.

In various exemplary embodiments, a metal recovery process comprises preparing a metal-bearing material, performing a reactive process on the metal-bearing material, extracting metal value from the processed metal-bearing material, and subjecting the extracted metal value to at least one metal recovery step, such as electrowinning.

Figure 1:
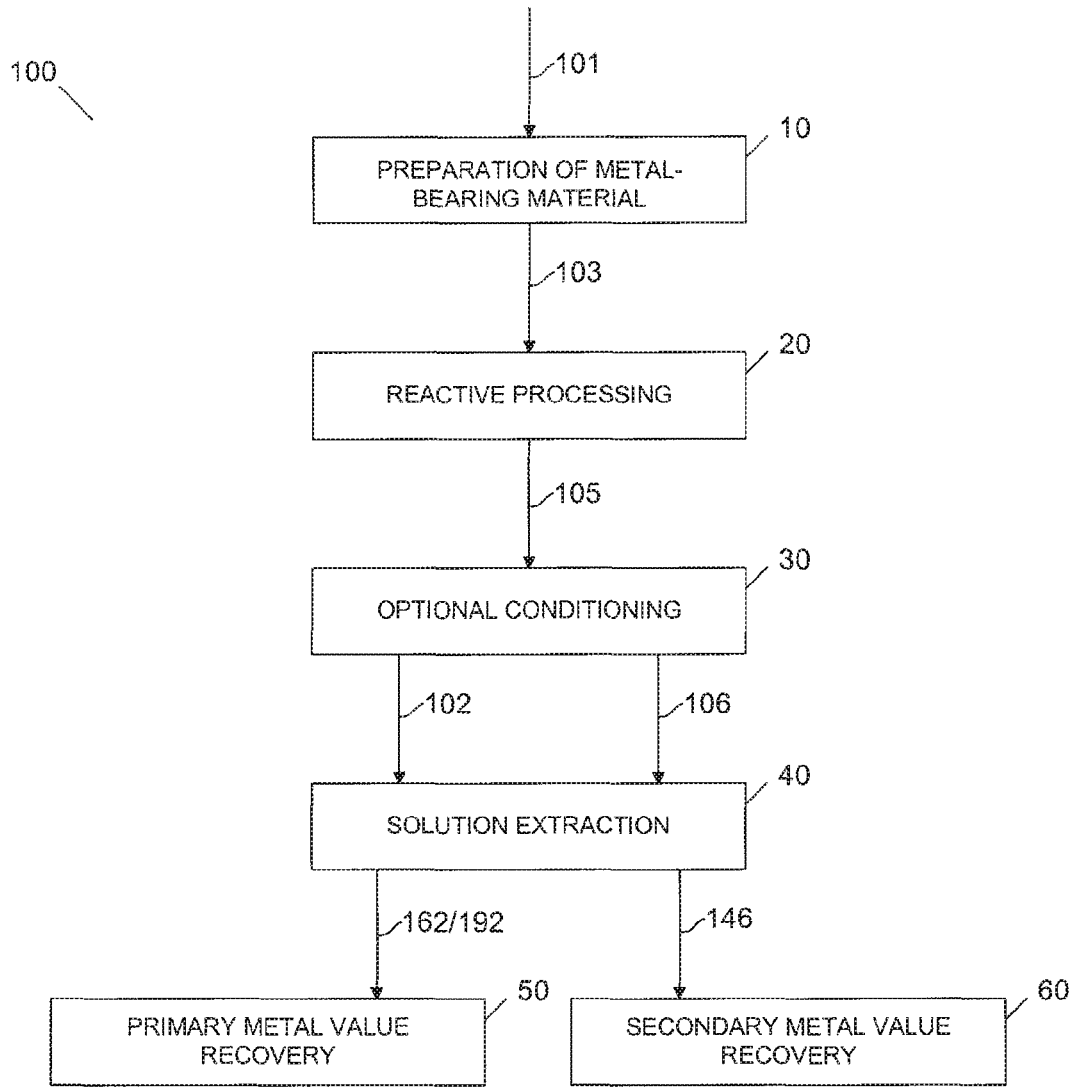
FIG. 1 illustrates a flow diagram of a metal recovery process in accordance with exemplary embodiments of the present invention.

FIG. 1 illustrates an exemplary metal recovery process 100 for recovering a metal from a metal-bearing material 101, including the steps of preparing metal-bearing material step 10, reactive processing step 20, optional conditioning step 30, solution extraction step 40, primary metal recovery step 50 and optional secondary metal recovery step 60. In various exemplary embodiments, metal recovery process 100 is configured to recover multiple metal values from metal-bearing material 101. For example, metal recovery process 100 may be configured to recover a primary and a secondary metal, such as cobalt, from an ore and/or concentrate comprising a significant concentration of the primary metal.

Metal-bearing material 101 may be an ore, a concentrate, or any other material from which valuable and/or useful metal values may be recovered. Such metal values may include, for example, copper, gold, silver, zinc, platinum group metals, nickel, cobalt, molybdenum, rhenium, uranium, rare earth metals, and the like. By way of a specific example, metal recovery process 100 is configured to recover copper from copper-bearing material, such as, for example, ores and/or concentrates containing chalcopyrite ($CuFeS_2$), chalcocite ($Cu_2S$), bornite ($Cu_5FeS_4$), and covellite (CuS), malachite ($Cu_2CO_3(OH)_2$), pseudomalachite ($Cu_5[(OH)_2PO_4]_2$), azurite ($Cu_3(CO_3)_2(OH)_2$), chrysocolla (($Cu,Al)_2H_2Si_2O_5(OH)_4 \cdot nH_2O$), cuprite ($Cu_2O$), brochantite ($CuSO_4 \cdot 3Cu(OH)_2$), atacamite ($Cu_2[OH_3Cl]$) and other copper-bearing minerals or materials and mixtures thereof.

During preparation of metal-bearing material step 10, metal-bearing material 101 is prepared for reactive processing step 20. Metal-bearing material 101 may be prepared in any manner that facilitates the recovery of metal values from metal-bearing material 101—such as, for example, manipulating a composition and/or component concentration of metal-bearing material 101—for the chosen reactive processing method of step 20. Desired composition and component concentration parameters can be achieved through a variety of chemical and/or physical processing stages, the choice of which will depend upon the operating parameters of the chosen processing scheme, equipment cost and material specifications. For example, metal-bearing material 101 may undergo comminution, flotation, blending, and/or slurry formation, as well as chemical and/or physical conditioning in preparation step 10 before metal extraction. Any processing of metal-bearing material 101 which improves the ability to recover metal values from the material is in within the scope of the present disclosure.

In various exemplary embodiments, step 10 comprises a controlled grinding step. Controlled grinding may be used to produce a uniform particle size distribution of metal-bearing material 101. Additionally, liquid, such as process water, may be added to metal-bearing material 101 to create a pulp density which corresponds to desirable operating conditions of the controlled grinding unit. Acceptable techniques and devices for reducing the particle size of the metal-bearing material include, for example, ball mills, tower mills, grinding mills, attrition mills, stirred mills, horizontal mills and the like, and additional techniques may later be developed and achieve the desired result of reducing the particle size of the metal-bearing material.

After metal-bearing material 101 has been suitably prepared for metal recovery processing, it may be combined with any number of liquid feed streams to form a metal-bearing inlet stream 103. Preferably, in an exemplary embodiment of the present invention, the liquid feed stream comprises process water, but any suitable liquid may be employed, such as, for example, recycled raffinate, pregnant leach solution, lean electrolyte, and/or other recycled streams from the metal recovery processes, including but not limited to secondary metal, such as cobalt or iron, recovery process streams.

After step 10, metal-bearing inlet stream 103 may be forwarded to a reactive processing step 20. Step 20 may comprise any process or reaction which places metal-bearing inlet stream 103 in condition for later metal recovery processing. Such processes may include, for example, a leaching step. In such configurations, the leaching step may comprise atmospheric leaching, ammonia leaching, pressure leaching, whole ore leaching, agitation leaching, heap leaching, stockpile leaching, pad leaching, thin-layer leaching, and/or vat leaching, at either ambient or elevated temperatures, or any process or reaction that puts metal values in metal-bearing inlet stream 103 in a condition suitable for later metal recovery processing, is within the scope of the present disclosure.

During step 20, metal values are solubilized or otherwise liberated from the metal-bearing material in preparation for later recovery processes. Any substance that assists in solubilizing metal values, and thus releasing metal values from a metal-bearing material, may be used. For example, where copper is the metal being recovered, an acid, such as sulfuric acid, may be contacted with the copper-bearing material such that the copper is solubilized for later recovery steps. However, it should be appreciated that any suitable method of solubilizing metal values in preparation for later metal recovery steps is within the scope of the disclosure.

After step 20, the metal-bearing product stream 105 may undergo one or more optional conditioning steps 30. In an exemplary embodiment, product stream 105 of reactive processing step 20 is conditioned to adjust the composition, component concentrations, solids content, volume, temperature, pressure, and/or other physical and/or chemical parameters to desired values. Generally, a properly conditioned metal-bearing product stream 105 will contain a relatively high concentration of soluble metal, for example, copper sulfate, in an acid solution and may contain few impurities. Moreover, the conditions of the metal-bearing product stream 105 may be kept substantially constant to enhance the quality and uniformity of the copper product ultimately recovered.

By way of example, step 30 may comprise adjusting certain physical parameters of the metal-bearing product stream 105. Step 30 may comprise, for example, reagent additions, flashing processes, and one or more solid-liquid phase separation steps. For example, in various exemplary embodiments, product stream 105 may be further conditioned in preparation for later metal value recovery steps by one or more solid-liquid phase separation steps for the purpose of separating solubilized metal solution from solid particles. This may be accomplished in any conventional manner, including use of filtration systems, CCD circuits, thickeners, clarifiers, and the like. A variety of factors, such as, for example, the process material balance, environmental regulations, residue composition, economic considerations, may affect the decision of which type of solid-liquid phase separation step to employ. In accordance with the various embodiments, one or more solid-liquid phase separation steps may be carried out using a conventional CCD circuit for washing of the residue stream to recover leached metal values to one or more solution products and to minimize the amount of soluble metal values advancing with the solid residue to further metal recovery processes or storage.

In various exemplary embodiments, step 30 comprises a solid-liquid phase separation step to produce a first metal-bearing solution and a second metal-bearing solution. In such embodiments, the first metal-bearing solution comprises a high-grade pregnant leach solution ("HGPLS") 102, comprising a relatively high concentration of dissolved primary metal value, and the second metal-bearing solution comprises a low-grade pregnant leach solution ("LGPLS") 106, comprising a lower concentration of dissolved primary metal value than HGPLS 102. While the concentration of a primary metal value in both HGPLS and LGPLS may vary on an absolute basis, in various embodiments, the HGPLS will have a higher concentration of a primary metal value than the LGPLS. Stated another way, HGPLS and LGPLS may contain very low, or very high, primary metal value concentrations.

In various exemplary embodiments, large amounts of wash water are utilized in a solid-liquid phase separation in step 30. This wash water collects the remaining dissolved metal values from product stream 105 and may become part of LGPLS 106. The separated solids may further be subjected to later processing steps, including other metal recovery processes, such as, for example, recovery of gold, silver, platinum group metals, molybdenum, zinc, nickel, cobalt, uranium, rhenium, rare earth metals, and the like, by sulphidation, cyanidation, or other techniques. Alternatively, the separated solids may be subject to impoundment or disposal.

In various exemplary embodiments, at least one HGPLS (e.g., HGPLS 102) and at least one LGPLS (e.g., LGPLS 106) are forwarded to solution extraction step 40. Step 40 produces at least one primary metal value containing rich electrolyte solution 192 and may produce one or more secondary metal value containing streams, e.g., low-grade raffinate 146. For example, as discussed in connection with FIG. 2 and FIG. 3, two HGPLS streams and one LGPLS stream may be forwarded to solution extraction step 40. In other aspects, a single HGPLS stream and a single LGPLS stream may be provided to solution extraction step 40, and the HGPLS stream may be divided into multiple streams during step 40.

In many instances, due to variations in concentration and quality of the metal-bearing material 101, it may be advantageous to mix one or more leach solutions prior to solution extraction to form a first metal-bearing solution and/or a second metal-bearing solution. Additionally or alternatively, it may be beneficial to process two or more separate leach solution streams produced by multiple leach processes in a single solution extraction process or system. For example, if an operation has both a heap leach operation and a pressure or agitated leach operation, then the heap leach solution, equivalent to the LGPLS, may need to be processed with a more concentrated pregnant leach solution, such as HGPLS, in order to provide for efficient use of the metal extraction reagent in the organic solution and the solution extraction system. It is not required that the HGPLS and LGPLS are produced from the same metal recovery process steps. In accordance with an exemplary embodiment of the present invention, either HGPLS 102, LGPLS 106, or both can be produced from one or more metal-bearing materials 101, and/or by one or more preparation, reactive processing, and/or conditioning steps (steps 10, 20, 30) and be subjected to solution extraction in the same solution extraction system.

In various exemplary embodiments, the LGPLS has a concentration of a primary metal value greater than about 20% of the concentration of the primary metal value in the HGPLS. Preferably, the LGPLS has a concentration of the primary metal value greater than about 40% of the concentration of the primary metal value in the HGPLS. Most preferably, the LGPLS has a concentration of the primary metal value greater than about 50% of the concentration of the primary metal value in the HGPLS. However, the use of the terms HGPLS and LGPLS should not be construed as limiting the present disclosure, and any relationship of the primary metal value concentrations between the metal-bearing solutions is within the scope of the present invention.

In step 40, at least one raffinate may be produced. The at least one raffinate can be low-grade raffinate 146, comprising a relatively low primary metal value concentration and a relatively high secondary metal value concentration. The low-grade raffinate may be forwarded to secondary metal value recovery processes, such as a secondary metal value recovery step 60, as discussed in more detail below.

Solution extraction step 40 of FIG. 1 is described in greater detail below with reference to a solution extraction process 200, illustrated in FIG. 2, and to a solution extraction system 300, illustrated in FIG. 3.

Figure 2:
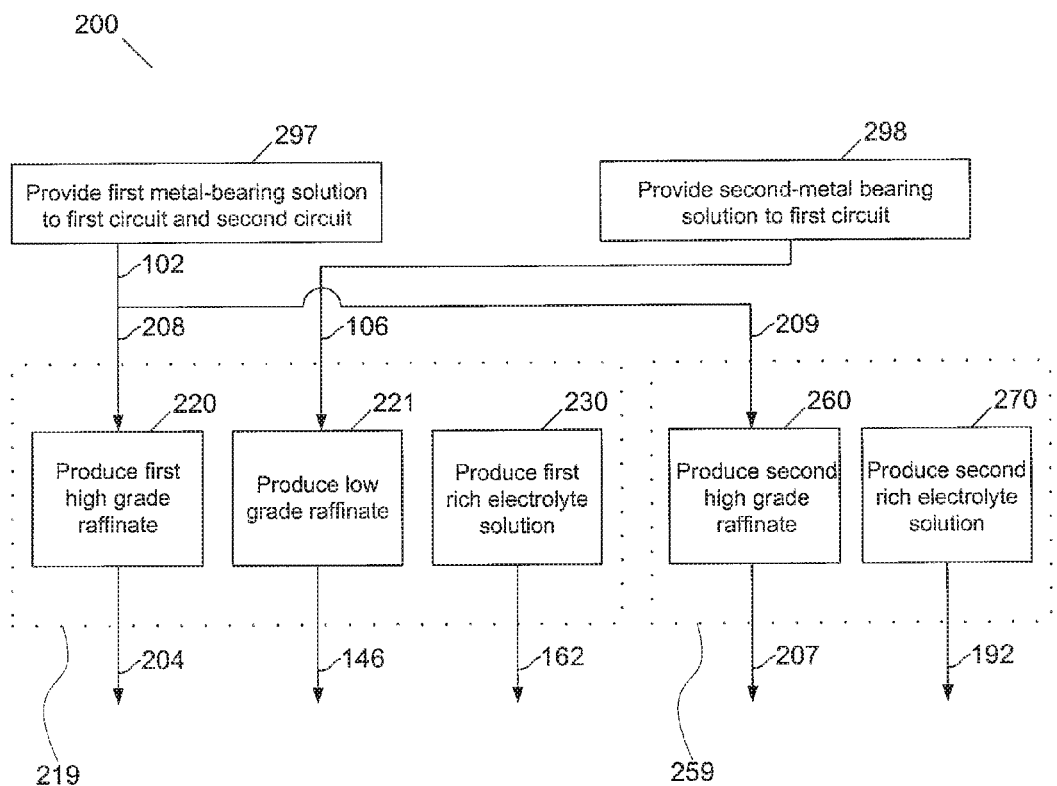
FIG. 2 illustrates a flow diagram of a solution extraction process for recovery of one or more metal values in accordance with exemplary embodiments of the present invention.

Generally, and as illustrated in FIG. 2, solution extraction process 200 comprises providing a first metal-bearing solution to a first solution extraction circuit and a second solution extraction circuit (step 297), providing a second metal-bearing solution to the first solution extraction circuit (step 298), producing a first rich electrolyte solution from the first solution extraction circuit (step 230), producing a low-grade raffinate from the first solution extraction circuit (step 221), and producing a second rich electrolyte solution from the second solution extraction circuit (step 270).

In accordance with exemplary embodiments, providing a first metal-bearing solution to a first and second solution extraction circuit step 297 comprises providing HGPLS 102, and providing a second metal-bearing solution to a first solution extraction circuit step 298 comprises providing LGPLS 106. In accordance with the various exemplary embodiments, HGPLS 102 is divided into at least two HGPLS streams that may be forwarded to at least two independent solution extraction circuits for solution extraction of a primary metal value. In accordance with exemplary embodiments of the present invention, HGPLS 102 from a single source, such as, for example, a HGPLS pond, is divided into a first HGPLS stream 208 and a second HGPLS stream 209. In accordance with other embodiments, first HGPLS stream 208 and second HGPLS stream 209 may be produced from distinct metal-bearing materials, preparations of metal-bearing material, reactive processing steps, conditioning steps, or any combination thereof. It should be understood that the source, identity, similarity, or composition of the first HGPLS stream 208 and second HGPLS stream 209 is not to be construed as a limitation to the scope of the present disclosure and that although HGPLS streams 208 and 209 are illustrated as originating from the same source, they need not do so; HGPLS streams 208 and 209 that are either substantially the same or substantially different are within the scope of the present invention.

In accordance with the illustrated embodiments, first HGPLS stream 208 is forwarded to a first solution extraction circuit 219, and second HGPLS stream 209 is forwarded to a second solution extraction circuit 259, the organic phase of which is separate from the organic phase of first solution extraction circuit 219 and which may be operated independently of the operational state of first solution extraction circuit 219. Furthermore, in accordance with exemplary embodiments, LGPLS 106 is also forwarded to first solution extraction circuit 219 for solution extraction of the primary metal value from LGPLS 106.

Generally, in accordance with exemplary embodiments and as will be described in greater detail below, in first circuit 219, LGPLS 106 is subjected to solution extraction in step 221, wherein low-grade raffinate 146 is produced. In accordance with further aspects, first HGPLS stream 208 is subjected to solution extraction in step 220, wherein a first high-grade raffinate 204 is produced. A first rich electrolyte solution 162, e.g., a solution containing a high concentration of the primary metal value, is produced in stripping step 230.

Additionally, in accordance with exemplary embodiments, in second circuit 259, second HGPLS stream 209 is subjected to solution extraction in step 260, wherein a second high-grade raffinate 207 is produced. In accordance with further aspects, stripping step 270 produces a second rich electrolyte solution 192, preferably containing a high concentration of the primary metal value.

Figure 3:
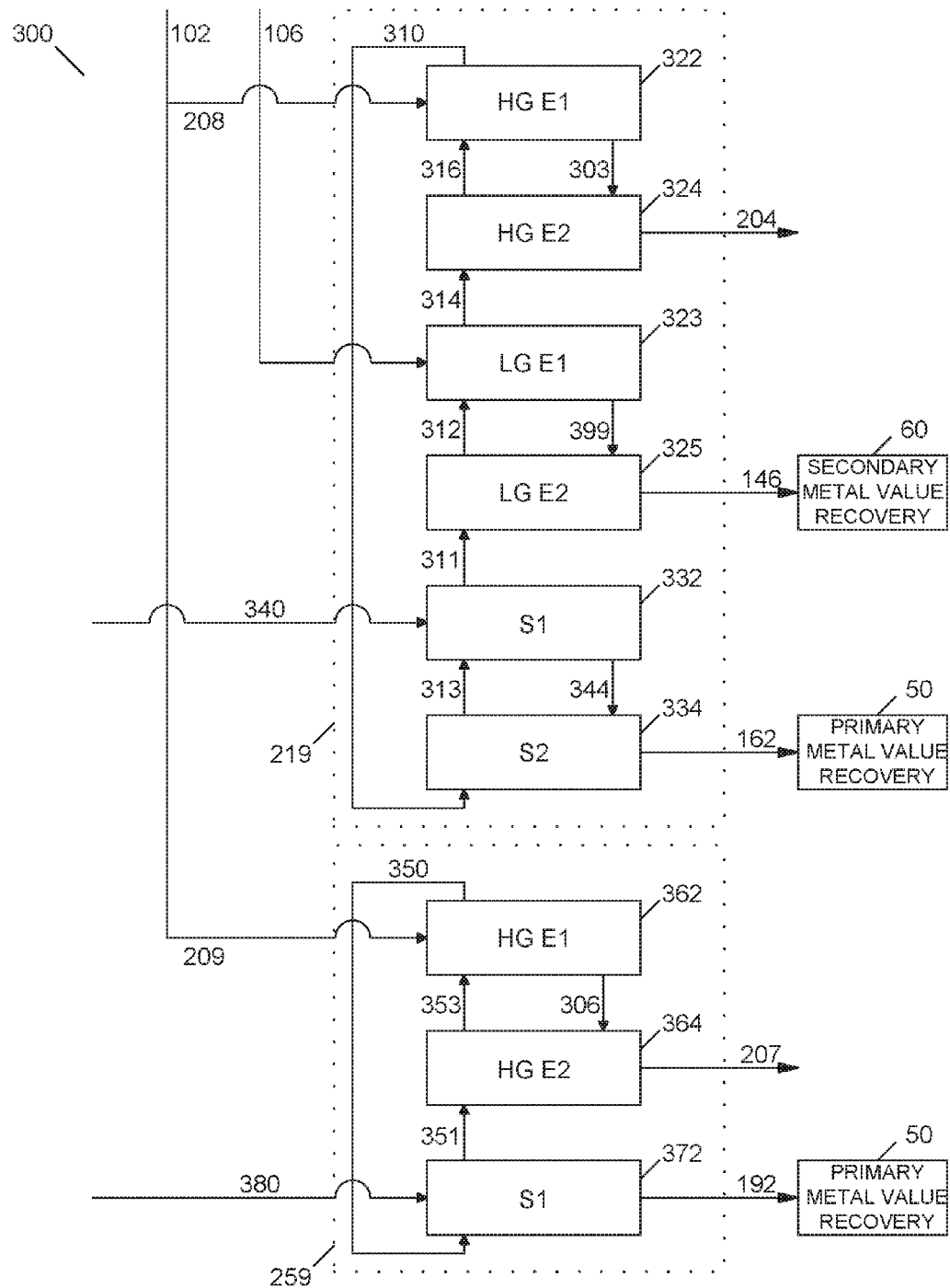
FIG. 3 illustrates a solution extraction system for processing multiple metal-bearing solution streams using two solution extraction circuits in accordance with exemplary embodiments of the present invention.

As illustrated in FIG. 3, solution extraction system 300 for implementing the solution extraction process 200 comprises first metal-bearing solution (HGPLS 102), second metal-bearing solution (LGPLS 106), first solution extraction circuit 219 coupled to first metal-bearing solution 102 and second metal-bearing solution 106, and second solution extraction circuit 259 coupled to first metal-bearing solution 102. Further, in accordance with various aspects, and as will be discussed in greater detail below, first solution extraction circuit comprises 219 at least two extractors and at least one stripping unit, and second solution extraction circuit 259 comprises at least one extractor and at least one stripping unit. In the illustrated example, first circuit 219 includes first and second high-grade extractors 322 and 324, first and second low-grade extractors 323 and 325, and first and second stripping units 332 and 334; second circuit 259 includes first and second high-grade extractors 362 and 364, and stripping unit 372.

In the illustrated embodiments, first HGPLS stream 208 is coupled to first high-grade extractor 322 and LGPLS 106 is coupled to first low-grade extractor 323 in first circuit 219, while second HGPLS stream 209 is coupled to first high-grade extractor 362 in second circuit 259. It should be understood, however, that LGPLS 106 may be forwarded to second circuit 259 in addition to or instead of first circuit 219. It should further be understood that solution extraction of the primary metal value may be performed using two, three, four, or more independent solution extraction circuits each separately used to perform solution extraction of a HGPLS stream, and that at least one LGPLS 106 may be forwarded to any one or more of the independent solution extraction circuits also used to perform solution extraction of a HGPLS stream, without departing from the scope of the present invention.

In accordance with the various exemplary embodiments, in first circuit 219, first high-grade extractor 322, first low-grade extractor 323, and first stripping unit 332 are coupled to one another in a series configuration with respect to the common organic solution containing a metal extraction reagent, with first HGPLS stream 208 and LGPLS stream 106 each subjected to solution extraction (steps 220 and 221, respectively, of FIG. 2) in at least a single extractor, and with a loaded organic solution 310 produced in first high-grade extractor 322 forwarded to at least a single stripping unit, for example, stripping unit 334. Likewise, in second circuit 259, first high-grade extractor 362 and first stripping unit 372 are also connected in a series configuration, with second HGPLS stream 209 subjected to solution extraction (step 260 of FIG. 2) in at least a single extractor and loaded organic solution 350 forwarded to at least a single stripping unit. However, a system comprising the solution extraction circuits coupled to the PLS sources described above and having any suitable number of extractors for each PLS stream coupled to a solution extraction circuit and any suitable number of stripping units is within the scope of the present invention.

In first circuit 219, one or more additional high-grade extractors, illustrated as second high-grade extractor 324, may be coupled in a series configuration between first high-grade extractor 322 and first low-grade extractor 323, and one or more additional low-grade extractors, illustrated as second low-grade extractor 325, may be coupled in a series configuration between first low-grade extractor 323 and first stripping unit 332. One or more additional stripping units, illustrated as second stripping unit 334, may be coupled in a series configuration between first high-grade extractor 322 and first stripping unit 332.

Likewise, in second circuit 259, one or more additional high-grade extractors, illustrated as second high-grade extractor 364, may be coupled in a series configuration between first high-grade extractor 362 and first stripping unit 372. One or more additional stripping units may be coupled in a series configuration between first high-grade extractor 322 and first stripping unit 332.

In the illustrated embodiment, in first circuit 219, second low-grade extractor 325 receives metal-depleted organic solution 311 from first stripping unit 332 and intermediate low-grade raffinate 399 from first low-grade extractor 323, producing a first partially metal-loaded organic solution 312 and low-grade raffinate 146. First low-grade extractor 323 receives first partially metal-loaded organic solution 312 and LGPLS 106, producing a second partially metal-loaded organic solution 314 and intermediate low-grade raffinate 399. Second high-grade extractor 324 receives second partially metal-loaded organic solution 314 and an intermediate high-grade raffinate 303, producing a third partially metal-loaded organic solution 316 and a high-grade raffinate 204. First high-grade extractor 322 receives third metal-loaded organic solution 316 and first HGPLS stream 208, producing loaded organic solution 310 and intermediate high-grade raffinate 303. Second stripping unit 334 receives loaded organic solution 310 and a partially metal-loaded electrolyte solution 344, producing rich electrolyte solution 162 and a partially metal-depleted organic solution 313. First stripping unit 332 receives partially metal-depleted organic solution 313 and lean electrolyte solution 340, producing metal-depleted organic solution 311 and partially metal-loaded electrolyte solution 344.

In second circuit 259 of solution extraction system 300, second high-grade extractor 364 receives metal-depleted organic solution 351 from first stripping unit 372 and an intermediate high-grade raffinate 306 from first high-grade extractor 362, producing a partially metal-loaded organic solution 353 and a second high-grade raffinate 207. First high-grade extractor 362 receives partially metal-loaded organic solution 353 and second HGPLS stream 209, producing a metal-loaded organic solution 350 and intermediate high-grade raffinate 306. First stripping unit 372 receives loaded organic solution 350 and a second lean electrolyte solution 380, producing metal-depleted organic solution 351 and second rich electrolyte solution 192.

The particular embodiment described in connection with FIG. 3 merely illustrates an exemplary system for solution extraction in accordance with the present disclosure. Various other exemplary embodiments comprise multiple stripping units and extractors arranged in series, parallel, and/or split configurations. For example, various exemplary embodiments may utilize a first circuit and/or second circuit with additional or fewer stripping units and/or extractors than first circuit 219 and/or second circuit 259. The use of any suitable number of stripping units and extractors, in any suitable configuration, is within the scope of the present disclosure.

High-grade raffinates 204 and 207 may be used beneficially in a number of ways. For example, all or portions of high-grade raffinates 204 and 207 maybe recycled to reactive processing step 20 (FIG. 1). The use of high-grade raffinates 204 and 207 in heap leaching operations may be beneficial because the acid and ferric iron values contained in high-grade raffinates 204 and 207 may optimize the potential for leaching oxide and/or sulfide ores that commonly dominate many leaching operations. For example, the ferric and acid concentrations of raffinates 204 and 207 may be used to optimize the Eh and pH of heap leaching operations. It should be appreciated that the properties of high-grade raffinates 204 and 207, such as component concentrations, may be adjusted in accordance with their desired uses. It should further be understood that all or portions of high-grade raffinates 204 and 207 may be combined in a high-grade raffinate storage unit prior to the subsequent uses described above, or that all or portions of high-grade raffinates 204 and 207 may be maintained separately without departing from the scope of the present invention.

It is desirable to produce metal-loaded organic solutions 310 and 350 with high primary metal value concentrations, which are suitably conditioned for metal recovery by stripping and electrowinning in primary metal value recovery 50 (FIG. 1). Additionally, in the first solution extraction circuit 219 coupled to LGPLS 106, it is desirable to produce a low-grade raffinate 146, which contains a very low primary metal value concentration and is suitable for secondary metal value recovery 60 (FIG. 1). In order to accomplish this, and in accordance with exemplary embodiments of the present invention, the metal-depleted organic solution 311 flow rate may be varied in correlation to the concentration of primary metal value in the incoming metal-bearing material and may be produced in one or more stripping units illustrated as first stripping unit 332 and second stripping unit 334. Additionally, in accordance with exemplary embodiments of the present invention, any suitable metal extraction reagent may be supplied to the organic solution in a solution extraction circuit by an external feed to the stripping units or to any other point prior to the organic solution contacting LGPLS 106. In accordance with exemplary embodiments of the present invention, the concentration of the metal extraction reagent in the metal-depleted organic solution 311 may also be varied in correlation to the grade of the incoming metal-bearing material.

As mentioned above, in accordance with exemplary embodiments of the present invention and referring to FIG. 2 and FIG. 3, metal-loaded organic solutions 310 and 350 are introduced to stripping units 334 and 372, and at least one metal value is stripped from each in stripping steps 230 and 270, respectively, wherein rich electrolyte solutions 162 and 192 are produced. In accordance with exemplary embodiments of the present invention, stripping steps 230 and 270 are performed using any fluid suitable for stripping metal values from a metal-loaded organic solution, such as lean electrolyte solutions 340 and 380 recycled from one or more electrowinning circuits in a primary metal value recovery process 50 (FIG. 1), described in detail below.

In accordance with various embodiments of the present invention and with reference now to FIG. 1 and FIG. 3, the primary metal value is removed from rich electrolyte solutions 162 and 192 during a primary metal value recovery process 50 such as, for example, electrowinning to yield a pure, cathode metal product. However, step 50 may comprise any metal recovery process, for example, electrowinning, sulphidation, precipitation, ion exchange or any other process suitable for recovery of metals, and may produce a pure metal product. In accordance with the various embodiments of the present invention, step 50 produces a primary metal value product and lean electrolyte solutions 340 and 380. As mentioned above, lean electrolyte solutions 340 and 380 can be recycled to solution extraction system 300, a lean electrolyte solution storage unit, and/or reactive processing step 20. In accordance with an exemplary embodiment of the present invention, rich electrolyte solutions 162 and 192 are forwarded to a rich electrolyte solution storage unit for processing in primary metal value recovery process 50. However, it should be understood that rich electrolyte solutions 162 and 192 may be forwarded to separate primary metal value recovery processes, that lean electrolyte solutions 340 and 380 may originate from distinct sources or primary metal value recovery processes, and that the lean electrolyte solution sources are not limited by the exemplary embodiment described above.

Referring now to FIG. 1 and FIG. 2, an exemplary secondary metal recovery step 60 includes recovering metal from a low-grade raffinate. In various exemplary embodiments, step 60 may comprise any metal recovery process such as, for example, electrowinning, sulphidation, precipitation, ion exchange, cyanidation, or any other process suitable for recovery of secondary metals. Further, as discussed in some detail below, in various exemplary embodiments, precipitation processes are used, making it advantageous to have low concentrations of primary metals in low-grade raffinate 146. Low-grade raffinate 146 may be sent to secondary metal value recovery 60 for extraction of secondary metal values including, but not limited to silver, platinum group metals, molybdenum, zinc, nickel, cobalt, uranium, rhenium, rare earth and actinide metals.

As mentioned above, the quality of metal-bearing material 101 can vary widely over the course of a metal recovery process 100. Due to this variation, both primary and secondary metal recovery processes can evidence losses in efficiency and overall processing yields. One reason for these losses is the inability to control and tune the quality and composition of low-grade raffinate 146 from solution extraction step 40. For example, low-grade raffinate 146 may be subjected to a selective precipitation process wherein all metal ions except for those of the secondary metal to be recovered such as, for example, cobalt, are eliminated from low-grade raffinate 146 by precipitating them as solids. These precipitated primary metal solids may be recycled to step 20. These precipitated solids may have a high probability of being rendered unrecoverable, depending on the precipitating mechanism employed. In the instance where there is high primary metal concentration in low-grade raffinate 146, the amount of precipitated primary metal solids recycled to step 20 may increase. This increase in precipitated metal solids may lead to process inefficiencies due to high circulating loads in various steps 30 and 40.

Similarly, the inability to control and tune the quality and concentration of low-grade raffinate 146 directly affects the costs associated with step 60. For instance, low primary metal quality and concentration in low-grade raffinate 146 requires less reagent to effect precipitation (operating cost savings). Thus smaller equipment can be used to recycle the copper precipitate (capital cost savings).

Various embodiments of the present metal recovery process advantageously allow for control and tuning of the low-grade raffinate 146 in a solution extraction circuit. Moreover, solution extraction step 40 may allow for control and tuning of low-grade raffinate 146 by adjustment of parameters such as, for example, the metal-depleted organic solution flow rate, metal extraction reagent concentration, feed material flow rate, and/or any combination thereof. Additionally, in various exemplary embodiments, the overall efficiency of the metal recovery process may be influenced by blending the primary metal solids precipitated from the low-grade raffinate with high-grade raffinate prior to recycling to the reactive process step. It should be understood that any of these parameters may be advantageously adjusted or controlled as may be desired to suitably adjust the concentration of primary metal value in the low-grade raffinate entering secondary metal recovery processes.

By making any of these adjustments to control and tune the metal value concentration in the low-grade raffinate based on incoming metal or quality, the low-grade raffinate may desirably contain very limited amounts of the primary metal value to promote efficient secondary metal value recovery, for example, recovery of cobalt. In an aspect of these embodiments, because both the HGPLS and LGPLS streams are treated in one solution extraction circuit, the primary metal value concentration of the LGPLS may be controlled and held constant by adjusting the LGPLS flow rate based on the primary metal value concentration. An additional benefit of the use of the exemplary process and system described herein, comprising two or more independent solution extraction circuits, is that down time due to maintenance or failure of an organic circuit component, such as an extractor or stripping unit, does not necessarily lead to a complete shutdown of the metal value recovery process. Separation of HGPLS into multiple streams for solution extraction processing using multiple, independent solution extraction circuits permits robust, ongoing recovery of a primary metal value despite a single solution extraction circuit being inoperative due to a need for maintenance, repair, or for any other reason. Stated another way, metal value recovery for a first metal value is more robust due to the parallel processing of HGPLS in two separate solution extraction circuits.

The solution extraction system of the present invention allows the solution extraction circuits used for recovery of primary and secondary metal values to be tuned and optimized, both in terms of metallurgical performance and capital and operating costs. There is a trade off between achieving optimum metallurgical performance and minimizing the capital costs of the operating facility. The decisions made regarding this trade-off are based on the performance and cost of the metal extraction reagent employed as well as the chemistry of the pregnant leach solution streams to be treated. For example, the use of a metal extraction reagent that exhibits rapid extraction kinetics may minimize the number of sequential extractors needed to achieve a satisfactory level of metal recovery. The presence of iron, manganese, or chloride in the pregnant leach solution streams may require the use of a wash stage prior to stripping. The number and placement of stripping units may be decided based on the stripping kinetics of the extraction reagent as well as its maximum metal loading capacity. Accordingly, various configurations are within the scope of the present invention.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. The subject matter of the inventions includes all novel and non-obvious combinations and sub combinations of the various elements, features, functions and/or properties disclosed herein and their equivalents.

The method and system described herein may be implemented to recover copper and other metals in a controlled manner. Other advantages and features of the present systems and methods may be appreciated from the disclosure herein and the implementation of the method and system.

What is claimed is:

1. A metal value recovery system comprising:
a primary metal value recovery system;
a secondary metal value recovery system; and
a solution extraction system comprising:
a first solution extraction circuit coupled to the primary metal value recovery system and to the secondary metal value recovery system, and
a second solution extraction circuit coupled to the primary metal value recovery system.

2. The system of claim 1, wherein the primary metal value recovery system comprises one of an electrowinning circuit, a sulphidation system, a precipitation system, and an ion exchange system.

3. The system of claim 2, wherein the primary metal value recovery system comprises an electrowinning circuit.

4. The system of claim 1, wherein the first solution extraction circuit and the second solution extraction circuit are configured to produce a rich electrolyte.

5. The system of claim 4, wherein the rich electrolyte is in fluid communication with the primary metal value recovery system.

6. The system of claim 4, wherein the first solution extraction circuit is configured to produce a high-grade raffinate and a low-grade raffinate.

7. The system of claim 6, wherein the low-grade raffinate is in fluid communication with the secondary metal value recovery system.

8. The system of claim 7, wherein the secondary metal value recovery system is configured to perform a selective precipitation process to produce a precipitated metal ion and a secondary electrolyte.

9. The system of claim 8, wherein the precipitated metal ion is uranium.

10. The system of claim 8, wherein the low-grade raffinate comprises a secondary metal value.

11. The system of claim 10, wherein the secondary metal value recovery system further comprises a secondary electrowinning circuit configured to extract a secondary metal value from the secondary electrolyte.

12. The system of claim 11, wherein the secondary metal value is cobalt.

13. The system of claim 4, wherein the high-grade raffinate is recycled to a reactive processing system.

14. A system for extracting metal value comprising:
a solution extraction system comprising a first circuit and a second circuit,
wherein the first circuit is configured to receive a first metal bearing solution and to produce a first rich electrolyte;
wherein the second circuit is configured to receive the first metal bearing solution and to produce a second rich electrolyte; and
wherein the first circuit is configured to receive a second metal bearing solution and to produce a low-grade raffinate;
a primary electrowinning circuit configured to extract a primary metal value from the first rich electrolyte and the second rich electrolyte; and
a secondary metal value recovery system configured to extract a secondary metal value from the low-grade raffinate.

15. The system of claim 14, wherein the low-grade raffinate comprises a secondary metal value comprising at least one of silver, platinum group metals, molybdenum, zinc, nickel, cobalt, uranium, rhenium, rare earth and actinide metals.

16. The system of claim 15, wherein the secondary metal value recovery system is configured to perform a selective precipitation process to precipitate a metal ion.

17. The system of claim 16, wherein the metal ion comprises uranium.

18. The method of claim 17, wherein the secondary metal value recovery system comprises a secondary electrowinning circuit.

19. The method of claim 18, wherein the secondary metal value comprises cobalt.

20. The method of claim 19, wherein the second metal-bearing solution is a low-grade pregnant leach solution.

* * * * *